(No Model.)
G. M. STERNBERG & A. A. LEHMANN.
ELECTRO MAGNETIC REGULATOR FOR VALVES AND DAMPERS.
No. 355,895. Patented Jan. 11, 1887.
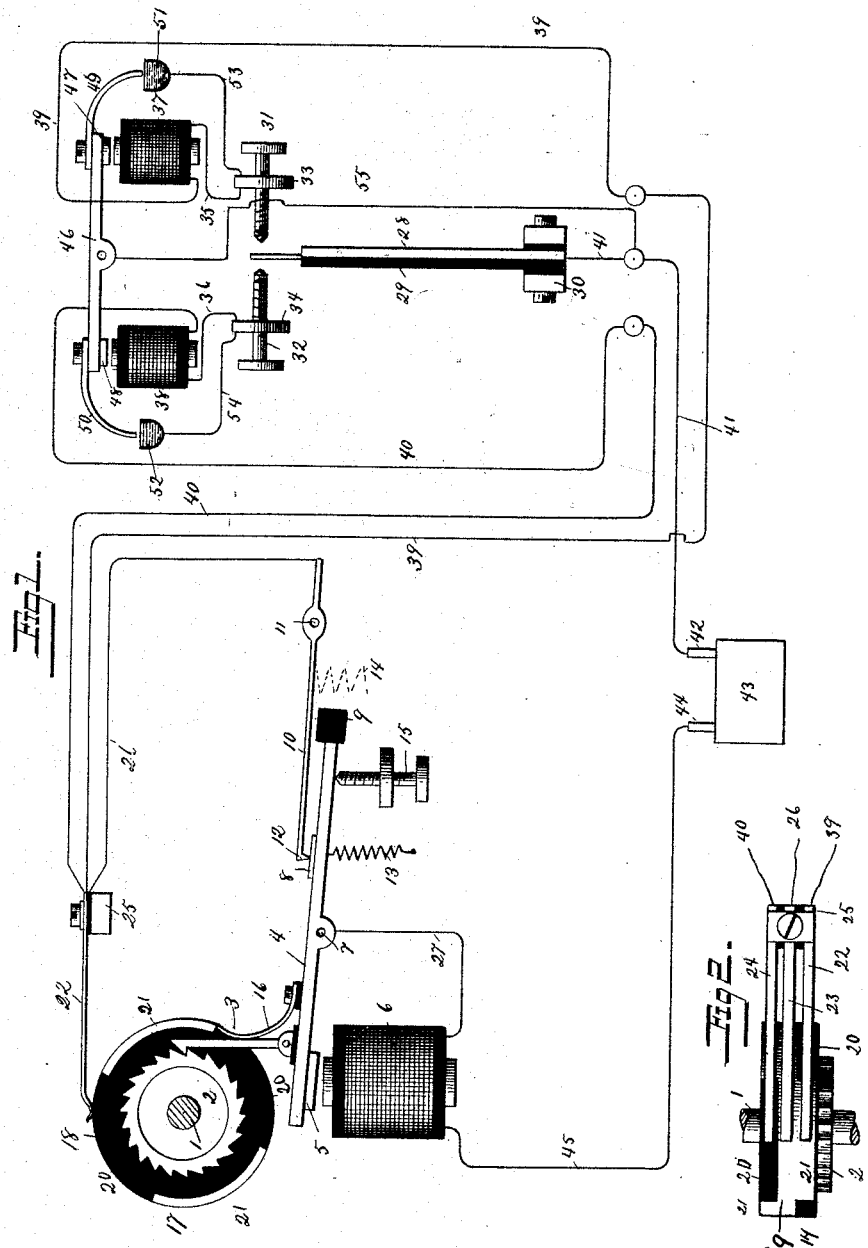

UNITED STATES PATENT OFFICE.

GEORGE M. STERNBERG, OF THE UNITED STATES ARMY, AND ANTHONY A. LEHMANN, OF BALTIMORE, MARYLAND; SAID LEHMANN ASSIGNOR TO SAID STERNBERG.

ELECTRO-MAGNETIC REGULATOR FOR VALVES AND DAMPERS.

SPECIFICATION forming part of Letters Patent No. 355,895, dated January 11, 1887.

Application filed September 9, 1886. Serial No. 213,141. (No model.)

*To all whom it may concern:*

Be it known that we, GEORGE M. STERNBERG, of the United States Army, temporarily residing at Baltimore, Maryland, and ANTHONY A. LEHMANN, of Baltimore, Maryland, have made certain new and useful Improvements in Electro-Magnetic Regulators for Valves and Dampers, of which the following is a specification.

Our invention relates to improvements in automatic valve or damper regulators of that particular class wherein the valve or damper actuating mechanism is set in motion, to open or close a valve or damper for or against the passage of a fluid therethrough, through the medium of an electric current from a single battery, which current is controlled by a thermostat or temperature indicator of any description.

To the accomplishment of the above the invention consists in the construction, arrangement, and combination of the several elements comprised therein, substantially as hereinafter set forth and illustrated in the accompanying drawings, wherein similar figures of reference denote similar parts.

In said drawings, Figure 1 represents a diagrammatical view illustrating so much of a valve or damper controlling mechanism as is necessary to set forth our invention. Fig. 2 is a detached detail view of parts of the operating mechanism.

In the present embodiment of our invention we have illustrated and shall hereinafter confine our description wholly to the devices whereby the operating mechanism of a valve or damper may be automatically set in motion to open or close a valve or damper for or against the passage of a fluid, as heated air, therethrough by the rising or falling of the temperature above or below a predetermined degree in an apartment or apartments wherein it is desirable to maintain the temperature at such predetermined degree.

It will be understood from the above that our invention may be employed in connection with any and all forms of valves or dampers and any and all descriptions of valve or damper operating mechanism.

To these ends we provide one of the shafts 1 of the operating mechanism with a ratchet-wheel, 2, the teeth of which are engaged by a pawl, 3, which is pivoted to an arm, 4, carrying an armature, 5, which operates in the magnetic field of an electro-magnet, 6, that is secured to or in connection with the frame of the valve-operating mechanism. The arm 4 is pivoted at 7, and is provided at 8 with a contact-strip, preferably of platinum, and at its extreme end with an insulating-block, 9, which impinges at times, hereinafter stated, upon an arm, 10, which is pivoted at 11, and normally bears at its end 12 upon the plate 8 of the arm 4, as shown, to close an electric circuit through the magnet 6, as will be hereinafter described.

In Fig. 1 we show the respective arms 4 and 10 in normal position, which position may be maintained either by gravity or through the medium of springs 13 and 14, one of which, the latter, attached to the arm 10, is shown by dotted lines. A distance-screw, 15, serves to limit the movement of the arm 4, while a spring, 16, secured to said arm 4, operates to hold the pawl 3 in engagement with the ratchet-wheel 2, as shown.

We provide the shaft 1, or another shaft connected to and operated from said shaft 1, with a contact-breaking wheel, 17, which preferably consists of a core, 18, of insulating material having a peripheral ring, 19, of metal, the opposite side edges of which are provided with notches or cut-away portions 20, which alternate—that is to say, the notches being formed upon one edge of said ring at points intermediate of the notches formed upon the opposite side thereof. When the ring 19 is in position upon its core the notches 20 therein are filled flush with the exterior surface of said ring with the insulating material of which said core is formed.

By reference to Fig. 2 it will be observed that the ring 19 extends at its middle in an unbroken line about the core and at each of its side edges in broken lines—that is to say, the laterally-projecting portions 21 of said ring alternating with the insulating material which extends into the cut-away portions 20 thereof, as before described.

An electric circuit is established through the ring 19 through the medium of brushes 22, 23, and 24, which extend from an insulating-block, 25, to and bear upon said ring at the middle and sides thereof, respectively, as shown.

By reference to Fig. 2 it will be observed that one of said brushes, 23, is in constant electric circuit with the ring 19, inasmuch as it bears upon said ring at its middle, and that the remaining brushes, 22 and 24, are in interrupted electrical contact with said ring, inasmuch as they alternately bear upon the laterally-projecting portions 21 of said ring and the insulating material in the cut-away portions 20 thereof. It will also be observed that while one of said brushes, 22 or 24, is in contact with one of the projecting portions 21 of the ring the other will be in contact with the insulating material in one of the spaces 20 of said ring, and also that said brushes are alternately in contact with the ring. A conductor, 26, connects the brush 23 with the arm 10, and a similar conductor, 27, connects the armature-carrying arm 4 with the electro-magnet 6, for reasons presently to be explained.

We will now describe the means employed to close an electric circuit through the electro-magnet 6 to operate the valve mechanism by the rising or falling of the temperature above or below a predetermined degree. To this end we employ a thermostat, which may be of any desired construction other than that shown in the drawings, and which consists in two plates, 28 and 29, of unequally expanding or contracting metal or of metal and vulcanite secured together and to a support, 30. One of the plates, the metal 28, extends at one end between regulating-screws 31 and 32, which operate in fixed studs or posts 33 and 34, that are in electrical connection, by conductors 35 and 36, with electro-magnets 37 and 38, which are connected by conductors 39 and 40 with the contact-brushes 22 and 24, respectively. The opposite end of the metal plate 28 of the thermostat is connected by a conductor, 41, with one pole, 42, of a battery, 43, the opposite pole, 44, of which is connected by a conductor, 45, with the magnet 6, which actuates the valve mechanism.

From the above-described construction it will be observed that inasmuch as the brush 23 is in constant contact with the ring 19, and is in electric connection with the magnet 6, and as one or the other of the brushes 22 or 24 is in constant contact with said ring, and as said brushes are in electric connection, respectively, through the conductors 39 and 40 and studs 33 and 34, with the screws 31 and 32, and also as the plate 28 of the thermostat is in electric connection through the conductor 41 with the battery 43, and said battery is in connection through the conductor 45 with the magnet 6, it follows that when said plate 28 is, by reason of the rise or fall of the temperature, thrown into contact with either the screw 31 or 32, the connected brush 22 or 24 of which is in contact with the ring 19, an electric circuit will be closed through the parts named, thereby energizing the magnet 6, causing it to attract its armature 5, and through the pawl 3 to rotate the ratchet-wheel 2 one step forward. At the same time the insulating-block 9, secured to the arm 4, which carries the armature, will be brought into contact with the arm 10, raising said arm and thus momentarily breaking the circuit, thus demagnetizing the magnet 6, and permitting the spring 13 to return the arm 4 to its normal position and the pawl 3 thereof to engage another tooth of the wheel 2. The return of the arm 10 to contact with said arm 4 will again close the circuit through the magnet, and the above operation will be repeated.

It will be understood from the above that the magnet 6 will be thus alternately magnetized and demagnetized so long as the brush 22 or 24, through which current is established with said magnet from the thermostat, is in contact with the ring 19, and that the passing of said brush, by reason of the revolution of the circuit-breaking wheel 18, into contact with the insulating material in the cut-away portions of said ring will break the circuit through said brush, and also bring the remaining one of the brushes 22 or 24 into contact with said ring.

The damper or valve now being fully open or closed, as the case may be, the consequent rise or fall of the temperature in the apartment wherein the thermostat is located will bring the plate 28 thereof into contact with the screw 31 or 32, which is in electric connection with the brush 22 or 24, now in contact with the ring 19, thus again closing circuit, as above described, through the magnet 6, and through the action thereof closing or opening the valve or damper.

In the foregoing description the plate 28 of the thermostat is supposed to remain in contact with one or the other of the screws 31 or 32 during the entire time the valve is being opened or closed. As, however, in practice, contact between said plate and screw is liable to be broken upon the slightest rise or fall of the temperature and before the valve or damper has been either fully opened or closed, it is necessary to provide means for maintaining the circuit through said magnet 6, after the same has been established, irrespective of said plate 28. To this end we provide the opposite ends of a centrally-pivoted bar, 46, with armatures 47 and 48, which operate, respectively, in the magnetic fields of the electro-magnets 37 and 38, and provide said bar with downwardly-projecting arms 49 and 50, adapted to make alternate contact with a conducting fluid or substance, as mercury, in cups 51 and 52, when either of the magnets 37 or 38 is energized, as will be presently explained.

Conductors 53 and 54 connect the cups 51 and 52, respectively, with the studs 33 and 34 of the contact-screws 31 and 32. A conductor, 55, connects the bar 46 with the conductor 41.

While from the foregoing description the operation of our improvement, so far as relates to the direct connections between the contact-screws 31 and 32 of the thermostat and magnet 6, will be readily understood, we will now describe the operation of said parts in connection with those last above described.

Suppose the valve to be open, the brush 24 in contact with the ring 19, and the respective arms 4 and 10 in normal position, as shown in Fig. 1. Under these conditions the rise of temperature will bring the plate 28 into contact with the screw 32, thus closing the electric circuit between said plate and screw. The current will now pass from battery through conductor 41 to plate 28, thence through screw 32 and conductor 36 to the electro-magnet 38, energizing said magnet and causing it to attract its armature 48, which operates to tilt the bar 46 and bring the arm 50 into the conducting fluid in the cup 52. From the magnet 38 the current will flow through the conductor 40 to the brush 24; thence through the ring 19, with which said brush is in contact, to the brush 23; thence through the conductor 26 to arm 10; thence to arm 4, conductor 27, and electro-magnet 6, energizing said magnet and causing it to operate, as hereinbefore described, and from the magnet the current flows through arm 45 to battery.

By the above description it will be seen that the intermittent action of the magnet 6 will operate through the pawl 3 to close the valve and thereby to lower the temperature, and thus cause the plate 28 to break contact with the screw 32. Should such break of contact occur before the full closing of said valve the current will continue to flow from battery through conductor 41 and the conductor 55, connected thereto, to the bar 46, thence through arm 50 thereof to the conducting material in the cup 52, thence through conductor 54 to the stud 34, and thence through the conductor 36, magnet 38, and conductor 40 to the brush 24, as before described, and will so continue to pass until by the revolution of the shaft 1 the valve or damper is closed and one of the insulated parts on the periphery of the circuit-breaking wheel 2 is brought into contact with the brush 24, which will break the circuit through said brush, as will be understood. At this time it will be understood that the remaining brush, 22, is in contact with the ring 19 and in position to establish circuit therethrough in its time. The fall of temperature will bring the plate 28 into contact with the screw 31, thus establishing circuit through said screw-conductor 35, magnet 37, and conductor 39 with the brush 22, and when contact is broken at said screw, before the valve is open, through conductor 55, bar 46, arm 49, cup 51, conductor 53, magnet and conductor 39 with said brush 22.

From the foregoing description it will be observed that but one magnet is employed to control and operate the mechanism by which the valve is opened and closed, that the action of said magnet during the operation of opening or closing the valve is intermittent, and, finally, that the current once established will continue to flow without regard to the break of circuit at the thermostat until the valve or damper is either opened or closed, as the case may be.

It will be evident that, instead of making the circuit-breaking wheel of insulating material with conducting-plates on its periphery, we can make the wheel of conducting material with insulating spaces or plates thereon. In this case the middle brush, 23, may be dispensed with and the circuit passed through the frame of the operating device to the shaft of the circuit-breaking wheel.

Without limiting ourselves to the exact construction and arrangement of parts herein described, we claim—

1. The combination, with a valve or damper operating mechanism, of a thermostat, a valve controlling and operating magnet in circuit with said thermostat, and automatic means controlled by said magnet, substantially as described, to intermittently energize said magnet to open or close said valve or damper, as and for the purpose described.

2. The combination, with a valve or damper operating mechanism, of a thermostat, a single magnet in circuit with said thermostat, means to connect said magnet to the valve-operating mechanism to control and operate the same, and automatic means controlled by said magnet to intermittently energize said magnet to open or close said valve, as and for the purpose described.

3. The combination of a valve mechanism, a magnet controlling and operating said mechanism, a battery, a thermostat, electrical connections between said magnet, thermostat, and battery, and means, substantially as described, to intermittently energize said magnet to open or close said valve, as and for the purpose specified.

4. The combination, with a valve or damper actuating mechanism, of a single magnet arranged to both open and close said valve, connections between said magnet and valve, a thermostat, a battery and independent electrical connections therefor, and means, substantially as described, to cause said magnet to be intermittently energized when the current is broken at said thermostat, as and for the purpose described.

5. The combination, with a valve or damper controlling and actuating mechanism, of a thermostat adapted to close independent electric circuits through a single valve or damper actuating magnet arranged to open and close said valve, and connections, substantially as described, whereby an electric circuit is maintained through said magnet when said thermostat is out of circuit, as and for the purpose set forth.

6. The combination, with a single valve or damper actuating magnet adapted to open and close said valve, a battery, and independent electrical connections between said magnet and battery, of a thermostat interposed in said connections and adapted to establish independent circuits therethrough, means, substantially as described, to maintain either of said circuits independent of said thermostat, and means to break said circuits when the valve is open or closed, as and for the purpose set forth.

7. The combination, with a single valve or damper controlling and actuating magnet arranged to both open and close a valve, a battery, a thermostat, and independent electrical connections between said magnet, battery, and thermostat, of a shunt device and a magnet interposed in each of said connections and adapted to actuate said shunt device and thereby to maintain a closed circuit through either of said connections when said thermostat is thrown out of such circuit, substantially as described.

8. In a valve actuating and controlling mechanism, a single intermittently-energized electro-magnet, a battery, a thermostat, and independent electrical connections between said magnet, battery, and thermostat, magnets interposed in said connections, and means, substantially as described, to alternately throw said magnets into circuit to maintain a closed circuit through one or the other of said connections when the thermostat is out of circuit therewith, as and for the purpose set forth.

9. The combination, with a valve controlling and operating magnet, a battery, a thermostat, electrical connections between said magnet, battery, and thermostat, and means, substantially as described, to maintain a closed electric circuit through said connections, of a circuit-breaking wheel connected with the valve-operating mechanism, as and for the purpose set forth.

10. The combination, with a valve-actuating mechanism, a thermostat, and a magnet actuating and controlling said valve mechanism and in circuit with said thermostat, of a circuit-breaker automatically controlled and actuated by said magnet to intermittently interrupt the circuit therethrough, and a circuit-breaking wheel connected to the valve-actuating mechanism, substantially as described.

11. The combination of a valve actuating and controlling magnet, its armature, and an arm carrying said armature and provided with an insulating-block, an arm adapted to alternately contact with said armature-carrying arm and the insulating-block thereon to intermittently interrupt a closed circuit through the magnet, a circuit-breaking wheel connected with the valve-actuating mechanism, brushes in constant and in interrupted circuit with said wheel, a battery, a thermostat, electrical connections, and means, substantially as described, to maintain a closed circuit through said connections when said thermostat is out of circuit therewith, as and for the purpose set forth.

12. The combination, with the actuating mechanism of a valve or damper, of a circuit-breaking wheel having a metallic band or ring provided at its opposite side edges with alternating circuit making and breaking spaces, brushes in constant and interrupted electric circuit with said ring, a valve actuating and controlling magnet, a battery, a thermostat, electrical connections, and means, substantially as described, to maintain a closed circuit through said connections when said thermostat is out of circuit therewith.

13. The combination, with a single controlling and actuating magnet of a valve, a battery, and independent electrical connections, and a thermostat adapted to close an electric circuit through each of said connections, of magnets interposed in said independent electrical connections, having armatures carrying operating-arms adapted to close and maintain a circuit through the battery, and the single valve operating and controlling magnet independent of said thermostat, substantially as described.

In testimony whereof we have signed our names to this specification in the presence of two subscribing witnesses.

GEORGE M. STERNBERG.
ANTHONY A. LEHMANN.

Witnesses:
MURRAY HANSON,
WILLIAM H. BERRY.